:::
United States Patent [19]

Rosaen

[11] 4,202,313
[45] May 13, 1980

[54] ROTARY ENGINE

[76] Inventor: Oscar E. Rosaen, 51 Roslyn Rd., Grosse Pointe, Mich. 48236

[21] Appl. No.: 828,299

[22] Filed: Aug. 29, 1977

[51] Int. Cl.² ............................................. F02B 53/08
[52] U.S. Cl. ................................... 123/212; 123/243; 418/101; 418/269
[58] Field of Search ............... 123/206, 208, 209, 212, 123/213, 239, 243, 216, 219; 418/269, 101

[56] References Cited

U.S. PATENT DOCUMENTS

| | | | |
|---|---|---|---|
| 1,495,526 | 5/1924 | Phillips | 418/269 X |
| 2,864,346 | 12/1958 | Taylor | 123/243 X |
| 3,250,260 | 5/1966 | Heydrich | 123/213 |

FOREIGN PATENT DOCUMENTS

| | | | |
|---|---|---|---|
| 1949907 | 4/1971 | Fed. Rep. of Germany | 123/243 |
| 1776002 | 6/1971 | Fed. Rep. of Germany | 123/208 |
| 2511689 | 9/1976 | Fed. Rep. of Germany | 123/212 |
| 1351278 | 12/1963 | France | 123/243 |
| 420860 | 12/1934 | United Kingdom | 123/243 |

*Primary Examiner*—Michael Koczo
*Attorney, Agent, or Firm*—Gifford, VanOphem, Sheridan & Sprinkle

[57] ABSTRACT

A rotary internal combustion engine having an ellipsoidal wall member which forms an ellipsoidal internal chamber. A drive shaft is rotatably mounted in the housing and extends transversely through the ellipsoidal chamber. A substantially cylindrical rotor is secured to the drive shaft within the chamber and has a plurality of circumferentially equidistantly spaced vane members radially slidably disposed within the rotor. A source of fluid pressure communicates with the radially inner end of the vane members to urge the vane members radially outwardly so that the vane members contact selected circumferential sections of the wall portion. A fuel supply means including a rotary compressor supplies a fuel and air mixture to the rotor which thereafter further compresses the fuel between the rotor, the wall portion, and adjacent vane members. The fuel air mixture is ignited by appropriate ignition means to thereby rotatably drive the drive shaft.

10 Claims, 2 Drawing Figures

ROTARY ENGINE

BACKGROUND OF THE INVENTION

I. Field of the Invention

The present invention relates generally to internal combustion engines and, more particularly, to such an engine which utilizes a rotor to rotatably drive an engine drive shaft.

II. Description of the Prior Art

There are a plurality of previously known internal combustion engines. Many of these previously known engines, for example conventional gasoline and diesel engines, utilize a plurality of pistons reciprocally disposed in cylinders and secured at one end to a crank shaft.

A still further type of internal combustion engine is a Wankel engine. The Wankel engine, in its most common form, comprises a triangular lobe which rotates both with respect to the drive shaft and with respect to the engine block or housing.

A still further type of internal combustion engine is a rotor driven or rotary engine. This type of engine, which is modelled after a hydraulic motor, comprises a rotor secured to a drive shaft and is rotatable within an ellipsoidal chamber. A plurality of vane members are circumferentially equidistantly spaced around the rotor and are radially slidable within the rotor. The vane members in combination with the ellipsoidal chamber and the rotor form a plurality of separated chambers into which a fuel/air mixture is compressed and ignited to rotatably drive the rotor, and hence the drive shaft.

These previously known rotary engines, however, have not enjoyed widespread commercial success for a number of reasons. One difficulty with these previously known rotary engines is that such engines have been quite inefficient. This disability has thus rendered the rotary engine unacceptable for a wide variety of internal engine applications.

A still further disadvantage of these previously known rotary engines is that due to the relatively large number of engine combustions per revolution of the drive shaft, such engines tended to rapidly overheat. Conventional engine cooling systems have proven inadequate to cool these previously known rotary engines and more efficient and complex cooling systems were deemed impractical due to the prohibitive cost involved.

Also, in previously known rotary engines utilizing vane members to separate the chambers, rather expensive and complicated means have been employed to urge the vanes into sealing contact with the wall defining the combustion chamber.

Summary of the Present Invention

The engine of the present invention overcomes the above-mentioned disadvantages by providing a rotary internal combustion engine which is highly efficient. Efficiency is achieved by providing a compressor which delivers a supercharged fuel/air mixture to the rotary engine. Further, means are provided to insure tight sealing engagement between the vanes and the housing throughout the combustion cycle and this, of course, provides for maximum engine efficiency.

In brief, the internal combustion engine of the present invention comprises a housing having an ellipsoidal wall portion which forms an ellipsoidal chamber within the housing. A drive shaft rotatably extends transversely through the ellipsoidal chamber and a rotor is secured to the drive shaft and is contained within the chamber.

A plurality of circumferentially equidistantly spaced vane members are slidably disposed within the rotor and are biased radially outwardly so that the vanes contact the ellipsoidal wall. A fuel/air mixture is communicated to the chamber by appropriate means so that the fuel/air mixture is compressed between the ellipsoidal wall, the rotor, and adjacent vane members. Timed ignition means ignite the fuel/air mixture to rotatably drive the rotor and hence the drive shaft.

The fuel/air mixture is delivered to the rotary engine from a compressor driven by the engine and also comprising a housing having an ellipsoidal chamber and vane members carried by a rotor and rotating in the chamber to compress the fuel/air mixture.

One-way valves connect the chambers defined by the vanes with the underside of the vanes so that the compressed gases are used to insure that the vanes are moved radially outwardly into sealing contact with the housing wall.

Brief Description of the Drawings

A better understanding of the present invention will be had upon reference to the following detailed description when read in conjunction with the accompanying drawings wherein like reference characters refer to like parts throughout the several views and in which.

Detailed Description of the Present Invention

Figure 1:
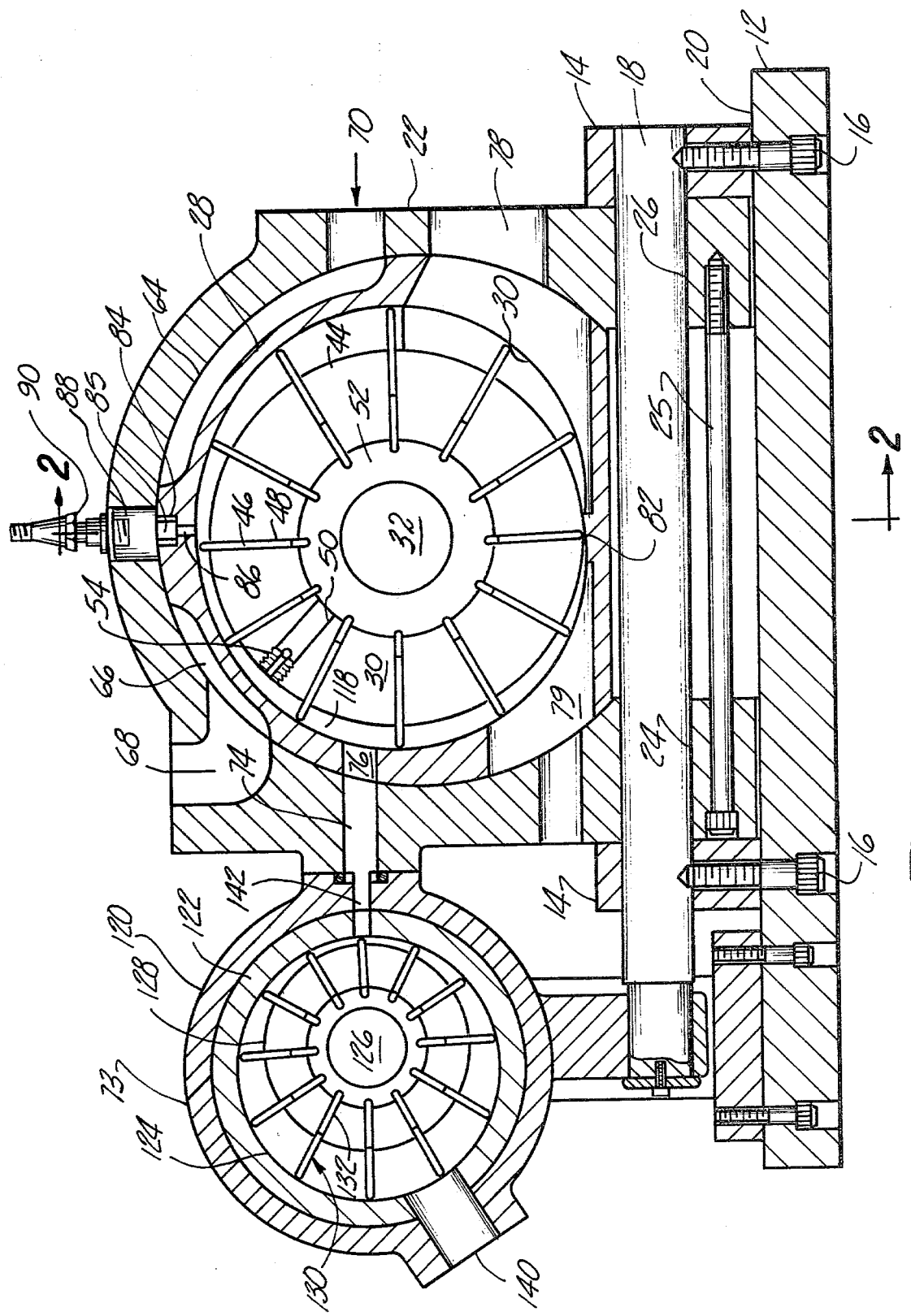
FIG. 1 is an axial cross-sectional view showing the internal combustion engine and compressor of the present invention.

With reference to FIG. 1 of the drawings, the internal combustion engine 10 of the present invention is thereshown and comprises a rigid base 12 having a pair of spaced supports 14 secured to the base 12 by any appropriate means, such as by bolts 16. A generally cylindrical support member 18 is disposed between and secured to each support 14 by the bolts 16 so that the support member 18 is generally parallel to the upper surface 20 of the base 12.

Still referring to FIG. 1, the engine 10 further comprises a housing 22 having registering bores 24 and 26 formed in the lower portion of the housing 22. The bores 24 and 26 are substantially the same diameter as the support member 18 and are adapted to receive the support member 18 therethrough so that the housing 22 is securely mounted to the support member 18 with a lower portion positioned between the supports 14 and against the face 20 of the base 12. An elongated bolt 25 extends between spaced portions of the housing 22 to lock the housing together.

Figure 2:
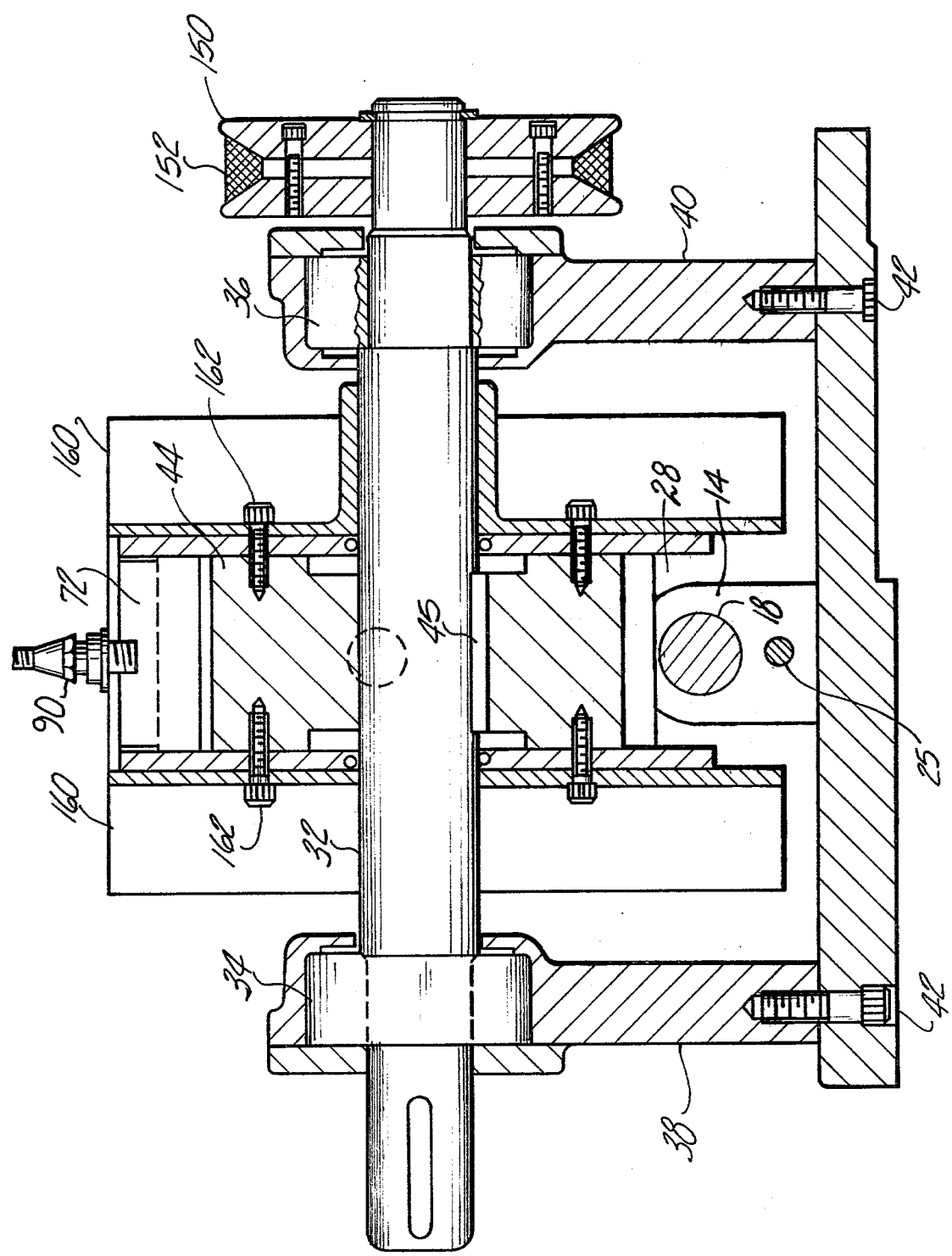
FIG. 2 is a cross-sectional view of the internal combustion engine of the present invention taken substantially along line 2—2 in FIG. 1.

Still referring to FIG. 1, a substantially ellipsoidal wall member 28 is mounted within the housing 22 and forms an ellipsoidal chamber 30 having a generally vertical minor axis and a generally horizontal major axis as viewed in FIG. 1. A drive shaft 32 extends transversely through the center of the ellipsoidal chamber 30 generally perpendicular to the support member 18. As can best be seen in FIG. 2, the drive shaft 32 is rotatably carried by bearings 34 and 36 which are in turn rigidly secured to the base 12 by bearing supports 38 and 40, respectively. The supports 38 and 40 are preferably mounted to the base 12 by bolts 42 and extend upwardly from the face 20 of the base 12.

A rotor 44 is contained within the ellipsoidal chamber 30 and is secured to the shaft 32 by any appropriate means, such as by a key 45. As can best be seen in FIG. 1, a plurality of vane members 46 are slidably received within radial slots 48 in the rotor 44 and the slots 48 are circumferentially equidistantly spaced around the rotor 44.

The vane members 46 are biased radially outwardly so that they contact and sealingly engage the inner portion of the ellipsoidal wall member 28. A good sealing contact between the outer edges of the vanes and the wall member 28 throughout the rotation of the rotor 44 is essential to provide a high efficiency rotary engine.

In the present invention, this is accomplished by directing a portion of the compressed gases between adjacent vanes 46 to the area beneath the vanes 46. Referring to FIG. 1, a port 50 is illustrated opening to an annular recess 52. The recess 52 is in registry with the slots 48 beneath the vane members 46 and port 50 connects with a one-way valve 54 disposed in the rotor 44 and opening to the chamber 30 intermediate adjacent vane members 46. Although only a single port 50 with a single one-way valve 54 in fluid communication therewith is shown in FIG. 1, it should be understood that one such assembly is disposed between each pair of adjacent vane members 46.

The ellipsoidal wall portion 28 is relatively thin walled and with the housing 22 forms an upper righthand chamber 64 and an upper lefthand chamber 66 (as viewed in FIG. 1) between the wall portion 28 and the housing 22. A coolant inlet 70 formed in the housing 22 communicates with the chamber 64 while a coolant outlet 68 formed in the housing 22 communicates with the chamber 66. A pair of passageways 72 (FIG. 2) permit fluid communication between the chambers 64 and 66 so that an engine coolant flows into the inlet 70, through the chamber 64 and the passageways 72, into the chamber 66 and out through the coolant outlet 68.

A compressor 73 (FIG. 1) supplies a fuel/air mixture through an inlet 74 in the housing 22 and to the chamber 30 via an opening 76 in the ellipsoidal wall portion 28. The opening 76 is adjacent the major axis of the chamber 30 so that the vane members 44 are radially extended. An opening 78 in the wall portion 28 permits the exhaustion of combustion fumes from the chamber 30. A further wall portion 82 in the housing 22 separates a primary air inlet opening 79 from the exhaust opening 78 and, as can be seen from FIG. 1, the wall portion 82 is substantially on the minor axis of the ellipsoidal wall portion 28. Consequently, the vane members 44 pass over the wall portion 82 so that a minimum of exhaust fumes are recirculated to the primary air opening 79.

Generally diametrically opposed from the wall portion 82, a cylindrical bore 84, having a reduced diameter portion 86 which communicates with the chamber 30 is provided in the wall member 28 and with a registering bore 88 found in the housing 22 is adapted to receive a spark plug 90 therein. The bore 84 is substantially in between the cross passageways 72 (FIG. 2) and forms a precombustion chamber 85 as will become hereinafter apparent. An appropriate ignition system (not shown) is coupled to the spark plug 90.

Referring now to FIG. 1, the compressor 73 is similar in construction to the engine 10 and comprises a housing 120 in which is mounted circular wall member 122. The wall member 122 defines a circular chamber 124 and a shaft 126 extends eccentrically through the chamber 124. A rotor 128 is keyed to the shaft 126 and carries a plurality of vane members 130 in slots 132. The vane members 130 are adapted to extend outwardly in the slots 132 to engage the inner surface of the wall member 122. The housing 120 and the wall member 122 are provided with an inlet 140 and an outlet 142. The inlet 140 is adapted to be connected to a source of a fuel/air mixture such as a carburetor (not shown) and the outlet 142 is adapted to be connected to the inlet passages 74 and 76 to thereby deliver a compressed fuel/air mixture to the chamber 30 of the engine 10.

The shaft 126 is drivingly connected to the shaft 32 by means of a pulley 150 (FIG. 2) carried on one end of the shaft 32 and connected by a drive belt 152 to a pulley (not shown) carried by one end of the shaft 126. Thus, rotation of the drive shaft 32 produces a corresponding rotation of the shaft 126.

Cooling fins 160 (FIG. 2) are fastened to the rotor 44 by bolts 162 to rotate therewith and to thereby provide cooling for the housing 22.

The operation of the engine 10 will now be described in detail. An air/fuel mixture is provided to the compressor inlet 140 from any suitable source such as a carburetor (not shown). Rotation of the compressor 73 causes the fuel/air mixture to be compressed and to be delivered through the inlet 74 and the opening 76 to the ellipsoidal chamber 30 so that the air/fuel mixture is entrapped within arcuate chambers 118 defined by adjacent vane members 46, the ellipsoidal wall member 28 and the rotor 44. Air from the primary air inlet 79 has already been introduced to a chamber 118 before it mixes with the compressed fuel/air mixture from air compressor 73. It will be understood, of course, that there are a plurality of arcuate chambers 118 which successively entrap the air/fuel mixture.

As the rotor 44 (FIG. 1) rotates clockwise past the major axis and towards the minor axis of the ellipsoidal chamber 30, the vane members 46 radially retract within the rotor 44. This in turn reduces the volume of the chamber 118 which further compresses the air/fuel mixture within the chamber 118.

As each successive vane member 44 uncovers the port 86 to the chamber 85, the compressed air/fuel mixture expands into the chamber 85 whereupon the air/fuel mixture is ignited by the spark plug 90. The chamber 85 thus forms a precombustion chamber so that the engine 10 is a stratified charge engine.

In response to the ignition of the air/fuel mixture, the expanding gases from the combustion chamber drivingly rotate the rotor 44 in a clockwise direction toward the major axis of the ellipsoidal chamber 30 until the combustion fumes are exhausted through the opening 78. A further rotation of the rotor 42 moves the rotor 42 past the wall portion 82 such that the wall portion 82 forms an effective barrier between the primary air inlet 79 and the exhaust outlet 78.

As has been previously described, coolant flows respectively through the inlet 70, chamber 64, cross passages 72, chamber 66 and out through the coolant outlet 68 and to the appropriate radiator means (not shown). This particular coolant flow is most advantageous since the coolant first contacts and removes heat from the ellipsoidal wall member 28 at the exhaust circumferential position of the wall member 28. By first cooling the hottest section of the ellipsoidal wall member 28, maximum cooling efficiency is achieved.

The fins 160 also aid in cooling by drawing in air as they rotate and circulating the air over the housing 22.

The valve assemblies 54 provide an economical and reliable means of insuring that sufficient pressure will be beneath the vane members 46 during all operational conditions to insure that the vane members 46 will be fully extended against the surface of the wall member 28 at all operational positions of the rotor.

Once the engine 10 has been started by conventional starting means (not shown) it will be used to also operate the compressor 73.

Oil can be mixed with the fuel/air mixture as in a 2-cycle engine to thereby reduce the need for lubrication.

It can thus be seen that a rotary engine has been described which is efficient and which is relative simple to construct and to operate.

Having thus described my invention, many modifications thereto will become apparent to those skilled in the art to which it pertains without deviation from the spirit of the invention as defined by the scope of the appended claims.

What is claimed is:

1. An internal combustion engine comprising:
   an annular open ended housing,
   a wall portion in said housing which forms an ellipsoidal chamber,
   a rotatably mounted drive shaft which extends transversely through said chamber,
   a substantially cylindrical rotor disposed within said chamber and secured to said shaft, said rotor having a plurality of circumferentially equidistantly spaced vane members radially slidably disposed in said rotor,
   means for urging said vane members radially outwardly so that said vane members sealingly engage selected sections of said wall portion,
   fuel supply means for supplying fuel to said chamber,
   fuel ignition means for igniting said fuel,
   cooling fin members fixed to said rotor and extending substantially entirely exteriorly of said housing so that substantially all of the area of said cooling fin members is in constant fluid communication with a cooling fluid, and
   wherein said cooling fin members comprise a first rotating plate and a second rotating plate fixedly secured to opposite sides of said rotor and rotatable therewith, and each of said plates having angularly spaced apart cooling fins secured thereto, said first and second plates cooperating to substantially enclose the ends of said annular housing therebetween.

2. The invention as defined in claim 1 wherein said means for urging said vane members radially outwardly comprises means for communicating a source of fluid pressure to the inner radial end of each of said vane members.

3. The invention as defined in claim 1 wherein said fuel supply means supplies fuel to said chamber adjacent the major axis of said chamber and wherein said fuel ignition means ignites the fuel adjacent the minor axis of said chamber.

4. The invention as defined in claim 1 and including a precombustion chamber formed in said housing in a position to communicate with the chamber formed between successive vanes when the fuel charge within said chamber has been compressed.

5. The invention as defined in claim 1 and in which said fuel supply means comprises a compressor, said compressor being driven by said engine.

6. The invention as defined in claim 2 and in which said communicating means comprises an annular chamber connecting with the inner radial end of said vane member and one-way valve means connecting the chamber between successive vane members with said annular chamber.

7. The invention as defined in claim 5 and in which said compressor comprises a substantially cylindrical rotor and vane members carried radially slidably mounted to said rotor.

8. The invention as defined in claim 1 wherein said cooling fin members comprise a first rotating plate and a second rotating plate fixedly secured to opposite sides of said rotor and rotatable therewith, and having angularly spaced apart cooling fins secured thereto, said first and second plates cooperating to substantially enclose the open ends of said annular housing therebetween.

9. An internal combustion engine comprising:
   an annular open ended housing,
   a wall portion in said housing which forms an ellipsoidal chamber,
   a rotatably mounted drive shaft which extends transversely through said chamber,
   a substantially cylindrical rotor disposed within said chamber and secured to said shaft, said rotor having a plurality of circumferentially equidistantly spaced vane members radially slidably disposed in said rotor,
   means for urging said vane member radially outwardly so that said vane members sealingly engage selected sections of said wall portion,
   fuel supply means for supplying fuel to said chamber, said fuel supply means comprising a compressor, said compressor comprising a substantially cylindrical rotor and vane members carried radially slidably mounted to said rotor, and said compressor being driven by said engine,
   fuel ignition means for igniting said fuel, and
   cooling fin members fixed to said rotor and extending substantially entirely exteriorly of said housing so that substantially all of the area of said cooling fin members is in constant fluid communication with the ambient air.

10. An internal combustion engine comprising:
    an annular open ended housing,
    a wall portion in said housing which forms an ellipsoidal chamber,
    a rotatably mounted drive shaft which extends transversely through said chamber,
    a substantially cylindrical rotor disposed within said chamber and secured to said shaft, said rotor having a plurality of circumferentially equidistantly spaced vane members radially slidably disposed in said rotor,
    means for urging said vane members radially outwardly so that said vane members sealingly engage selected sections of said wall portion,
    fuel supply means for supplying fuel to said chamber,
    fuel ignition means for igniting said fuel,
    cooling fin members fixed to said rotor and extending substantially entirely exteriorly of said housing so that substantially all of the area of said cooling fin members is in constant fluid communication with the ambient air, and
    wherein said cooling fin members comprise a first rotating plate and a second rotating plate fixedly secured to opposite sides of said rotor and rotatable therewith, and having angularly spaced apart cooling fins secured thereto, said first and second plates cooperating to substantially enclose the open ends of said annular housing therebetween.

* * * * *